Dec. 22, 1964    A. AFFOLTER    3,162,075

TOOL HOLDER TURRET

Filed Sept. 25, 1961

INVENTOR

AUGUSTE AFFOLTER
BY Irwin S. Thompson
ATTY.

United States Patent Office 3,162,075
Patented Dec. 22, 1964

3,162,075
TOOL HOLDER TURRET
Auguste Affolter, 42 Rue Vermont, Geneva, Switzerland
Filed Sept. 25, 1961, Ser. No. 140,313
Claims priority, application Switzerland, Sept. 29, 1960,
10,992/60
8 Claims. (Cl. 82—36)

The present invention has for its object a tool holder turret comprising a pivot provided with means enabling its being rigidly fixed to a machine-tool, a support orientable in different angular positions engaged and fixed by tightening means on said pivot, this support presenting a fastening device for a tool holder piece. The tool holder turret according to the invention comprises a locking device, fixing on the one hand the angular positions of said support with respect to said pivot and on the other hand and at the same time the bottom surfaces of said support on the upper surfaces of a slide of the machine-tool. Said locking device is constituted by a first and a second locking member fast with said pivot and the support respectively, as well as by a third locking member displaceable under the action of tightening means from an inactive position, for which said first and second members are freed until an active position for which said third locking member is simultaneously in mesh with said first and second locking members and thereby determines and fixes the angular position of said adjustable support on the upper surface of said slide.

The attached drawing shows schematically and by way of example one embodiment of the tool holder turret according to the invention.

Figure 1:
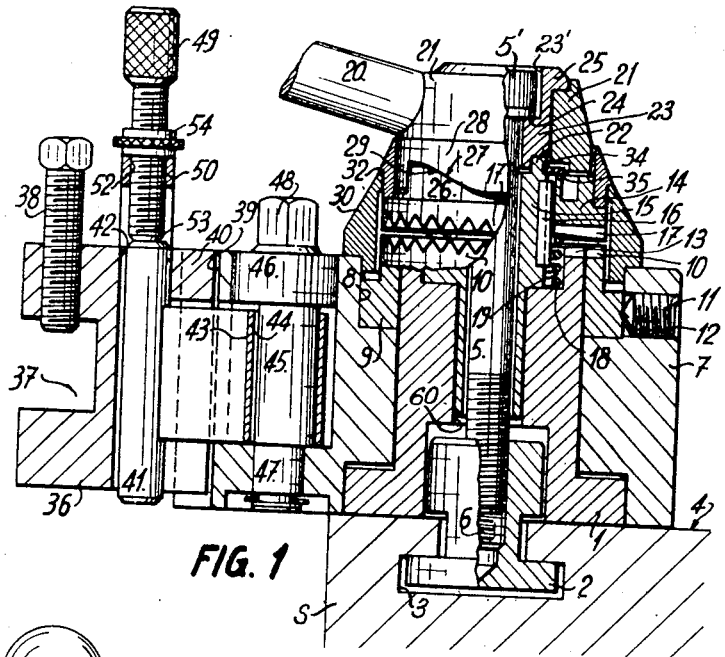
FIG. 1 is an elevational view in cross section, at a greater scale, of this turret.
Figure 2:
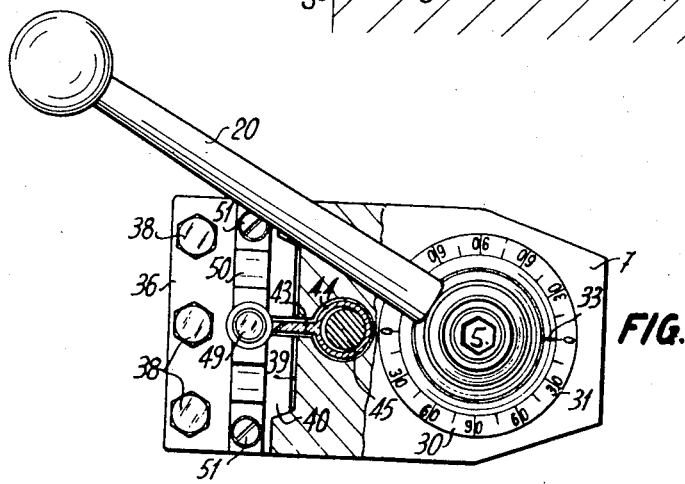
FIG. 2 is a top view of said same turret at normal scale.

This tool holder turret comprises a pivot 1 provided with means enabling its being rigidly fixed to a machine-tool. In the example shown, these means comprise a tenon 2 disposed in a slot 3 having the form of a T and provided in a slide S of the machine-tool. The pivot 1 is intended to be rigidly fastened to the top surface 4 of the slide of the machine-tool, for example by means of a screw 5 screwed in a tapped bore 6 made in said tenon 2.

On pivot 1 there is engaged an orientable support 7. Said orientable support 7 has, on its top surface, a recess 8 in which a ring 9 is disposed. The top surface of ring 9 presents, a first locking member constituted by a toothed rim 10. The position of said ring 9 in support 7 is further guaranteed by means of a set screw 11 engaged in a tapped bore 12 of the support 7. Screw 11 locks ring 9 in the recess 8. The pivot 1 carries a second locking member constituted also by a toothed rim 13. These two toothed rims 10 and 13 are concentric, disposed in the same plane and have identical teeth.

A ring 14 movable downwardly and upwardly is engaged on the top part of a hollow member 15 of pivot 1. In the example shown, member 15 is constituted by a sleeve fixedly disposed in bore 60 of pivot 1. Member 15 carries a key 16 rendering the ring 14 angularly fast with the pivot 1 while still leaving ring 14 free for axial displacement. A spring 18, disposed in a recess 19 of pivot 1, tends to maintain ring 14 away from rims 10 and 13. Ring 14 contains a third locking member constituted by a toothed rim 17 which is complementary to rims 10 and 13.

Tightening means enable displacing ring 14 from an inactive position, against the action of spring 18 until an active postion for whch rims 10 and 13 are in mesh with rim 17, whereby on the one hand the angular position of support 7 with respect to pivot 1 is rigidly and precisely fixed and on the other hand and at the same time the bottom surface of support 7 is rigidly and precisely fixed on the upper surface 4 of the slides. The tightening means comprise in the present case an operating lever 20 having a hub 21 by means of which it is rotatively mounted coaxially with respect to pivot 1. Hub 21 is rotatively mounted on a sleeve 23 bearing downwardly against the end 22 of member 15. Sleeve 23 has a bore therein which has the same diameter as that of the inside diameter of member 15. Sleeve 23 also has a recess 23' in the top part which has a larger diameter than the bore thereby defining a shoulder 24 therebetween. The head 5' of screw 5 fits within recess 23' and acts on shoulder 24 while the threaded part of screw 5 acts on tenon 2 so that sleeve 23, member 5, and pivot 1 are secured to top surface 4 of slide S. Sleeve 23 further has flange 25 which abuts against hub 21 to maintain same on sleeve 23.

A clamping device for quick clamping is interposed between hub 21 and said ring 14. This device comprises three cam surfaces 26 provided on the top surface of said ring 14. These cam surfaces 26 form, on one of their sides, a cam member 27. The hub 21 presents also, on its lower surface, three corresponding cam surfaces 28, a part 29 of which is also in the form of a cam member intended to co-operate with the cam member 27 of each cam surface 26.

One understands easily, from the preceding description, that a rotation of a fraction of a revolution only, say less than 120°, of the lever 20 causes an axial displacement of the ring 14 as the angular position of said ring is fixed by key 16, so that its rim 17 engages itself in the rims 10 and 13 to render them solid the one with the other and to lock the support 7 in a determined angular position with respect to the pivot 1.

The two toothed rims 10, 13 fast respectively with the support 7 and the pivot 1, the toothed rim 17 and the tightening means, causing the axial displacement of the toothed rim 17 and causing its engagement and disengagement with the toothed rims 10 and 13, constitute a locking device of the relative angular position of the support 7 with respect to the pivot 1.

The advantages of the described locking device are the following:

The precision of the angular position of support 7 with respect to pivot 1 and also the precision of the angular position of said support with respect to slide S of the machine tool is no longer influenced either through the clearance of the fastening means of ring 14 on pivot 1 nor through the clearance which is absolutely necessary to foresee in order to allow the downward and upward displacements of ring 14, because the aim of the teeth of ring 14 is reduced solely to the adjustment with a high precision of the adjustable support provided with the teeth of rim 10 with respect to the teeth of rim 13 which constitutes a unit with the pivot 1, whereby said aim is achieved by means of the pressure exerted by the lateral surfaces of the teeth of rim 17 of said displaceable ring 14 on the corresponding lateral surfaces of the teeth of rims 10 and 13.

The precistion of the angular position is of greatest importance, since the outer ends of the cutting edges of the tool, when fastened on said support 7, are located at a distance from the pivoting axis so that very little clearance would cause a corresponding magnified inaccuracy of the angular position. Further, through the pressure exerted on the lateral walls of the teeth of rim 10, the under surface of adjustable support 7 is passed against the upper surface of slide 4 of the machine tool. The described locking device allows also, by means of a single operating lever 20 and by displacing said lever over an angle lesser than 120°, the achievement of both the setting of the angular position and the rigid tightening of the support 7 on the slide S of the machine tool.

A ring 30 having an angular graduation 31 is mounted on support 7 in order to facilitate locating the different angular positions of support 7. Another ring 32 mounted on ring 14 bears a mark 33, located opposite the graduation 31 and indicates the angular position of the cutting tools.

The hollow member 15 presents at the vicinity of its extremity 22 a groove 34 in which a spring washer 35 is engaged thereby ensuring the engagement of the ring 14 on the member 15.

This tool holder turret comprises further a quick fixing devices of a tool holder piece 36 on the orientable support 7 in which a groove 37 is provided and is intended to receive the tool. Screws 38 enable the locking of the tool in said groove 37. The correct position of the tool holder piece 36, with respect to the support 7, is ensured by a corresponding groove 39 and tenon 40, disposed vertically on the contact surfaces of the parts 7 and 36.

The quick fixing device of the piece 36 on the support 7 comprises a part 41 in the general form of a hinge, carried by the support 7 and which is engaged in a slot 42 of the tool holder piece 36. This part 41 has an extension 43 in which a circular hole 44 is provided. A shaft 45 is engaged in this hole 44. The two ends 46 and 47 of this shaft 45 revolve in bearings provided by support 7. The central portion of this shaft 45 is eccentric with respect to the ends 46 and 47.

As one can easily understand, any driving in rotation with the aid of a key adjusted on the square portion 48 of shaft 45 will cause a transversal displacement of the part 41. This shaft 45 constitutes thus an eccentric tightening mechanism enablying the quick locking and the unlocking of the tool holder piece 36 with respect to the support 7.

Further, the regulating means of the screw 49 enables one to fix the height of the tool-holder piece 36 with respect to its support 7. These means comprise a piece 50 fixed by means of screws 51 on the tool holder piece 36. This piece 50 provides in its central portion a tapped bore 52 in which the screw 49 is engaged. The end 53 of this screw 49 abuts against the top extremity of part 41. As part 41 is vertically disposed, as well as tenon 40, it is easy to understand that by screwing or unscrewing more or less the screw 49, one will be able to vary the position in height of the tool holder piece 36 with respect to the support 7. Further a counter lock 54 enables locking in a stable position the screw 49 with respect to the piece 50.

It is to be noted that the part 41, and especially its extension 43, is lodged with clearance in the support 7, which provides the extension and part 41 with certain displacements in the transversal direction. Thus during the tightening of the eccentric mechanism 45, the part 41 takes its place under the approach movements of the tool holder piece 36 against the support 7 which guarantees a setting in exact position independent from the effort of tightening, exerted on the eccentric mechanism 45.

Numerous variants of execution of the described tool holder turret can be imagined, especially with regard to the form of the toothing of the rims 10, 13 and 17. Further, the eccentric mechanism 45 for fixing the tool holder piece 36 on the orientable support 7 could be replaced by any other fixing mechanism normally used.

The fixing of the pivot 1 on the machine-tool by means of a tenon 2 engaged in a T-shaped slot 3 could be replaced by any other known fixing means.

I claim:

1. A tool holder turret comprising a pivot provided means enabling the fixing of said pivot on a machine tool, a support orientable in different angular positions engaged and fixed by tightening means on said pivot, said support having a fixing device for a tool holder piece, a locking device for fixing the angular positions of said support and of said pivot with respect to a slide of the machine tool including a first and a second locking member fast with said pivot and said support respectively, a third locking member displaceable with respect to said first and second locking members, and tightening means engaging said third locking member to maintain same in an inactive position wherein said first and second locking members are disengaged from said third locking member and to move said third locking member into an active position wherein said third locking member is simultaneously in locking engagement with said first and second locking members and fixes their relative angular position whereby said support is rigidly fixed in a precise angular position on the slide of the machine tool.

2. A tool holder turret as claimed in claim 1, in which the locking members carried by the pivot and the orientable support respectively are constituted each by a toothed rim, these two rims being concentric one to the other and disposed in the same plane and having identical teeth, said third locking member being constituted by a ring having a toothed rim complementary to that of said first and second rims and engaged on said pivot, said tightening means when in said active position pressing said ring against said first and second rims in order that said third toothed rim engages in the teeth of said first and second rims and renders them solid the one with the other and thereby locks said orientable support in a precise angular position on the upper surface of the slide of the machine tool.

3. A tool holder turret as claimed in claim 1, in which said tightening means comprise an operating lever having a hub through which it is rotatively mounted on said pivot, a cam means for quick tightening being interposed between said hub and said third locking member.

4. A tool holder turret as claimed in claim 1, in which said tightening means of said pivot comprises a screw, a hollow member driven in said pivot, a sleeve coaxial to the axis thereof, said screw crossing said pivot, said hollow member and said sleeve, a tenon engaged in a T-shaped groove disposed in the slide of the machine tool, said screw engaging said tenon, a head of said screw bearing on said sleeve and pressing said sleeve against the upper surface of said hollow member, whereby said screw rigidly fixes said pivot on said slide, said sleeve defining an axial abutment for a hub carrying an operating lever, said screw when screwed in said tenon ensuring the rigid tightening of said pivot and supporting the stresses caused by the locking in a precise angular position of said support on said machine tool.

5. A tool holder turret as claimed in claim 1, comprising further a ring mounted on said support and provided with a graduation, a further ring fixedly mounted on said third locking member and being provided with a mark located opposite said angular graduation whereby said mark indicates the angular position of said support, said third locking member having means for being keyed on said pivot.

6. In a tool holder device for holding tools on a machine tool, pivot means mounted on a surface of said machine tool, support means rotatably mounted on said pivot means, fixing means disposed between said surface and said pivot means to engage said pivot means and maintain same in a fixed position on said surface, said pivot means and support means having first and second locking means on their upper portions which are disposed in the same plane, third locking means axially movable with respect to said first and second locking means from an inactive position wherein said third locking means is normally disengaged from said first and second locking means to an active position wherein said third locking means is in engagement with said first and second locking means, and engaging means operatively engaging said third locking means to move same into engagement with said first and second locking means to fix their relative angular position so that said support means is rigidly fixed in a precise angular position on said surface of the machine tool.

7. In a tool holder device according to claim 6 wherein said fixing means comprise tenon means disposed in a T-shaped slot in said surface, a hollow member disposed in a bore in said support means, a sleeve member engaging the top surface of said hollow member and having an opening therethrough, and screw means passing through the opening in said sleeve member and said hollow member to engage said tenon means.

8. In a tool holder device according to claim 6 wherein said third locking means includes a ring member having cam means thereon, said engaging means including a hub member rotatably mounted on said fixing means and having further cam surfaces corresponding to said first-mentioned cam surfaces so that when said hub member is rotated said ring member is moved axially.

References Cited by the Examiner
UNITED STATES PATENTS

| | | | |
|---|---|---|---|
| 1,152,055 | 8/15 | Schellenbach | 82—36 X |
| 2,505,684 | 4/50 | Mc Clernon | 82—36 X |
| 2,770,993 | 11/59 | Olson | 82—36 |

FOREIGN PATENTS 341,046  10/59  Switzerland.

WILLIAM W. DYER, Jr., *Primary Examiner.*

RICHARD H. EANES, Jr., *Examiner.*